(12) United States Patent
Gauthier et al.

(10) Patent No.: US 11,848,917 B2
(45) Date of Patent: Dec. 19, 2023

(54) BLOCKCHAIN-BASED ANONYMOUS TRANSFERS ZERO-KNOWLEDGE PROOFS

(71) Applicant: ToposWare Inc., Sunny Haimu (JP)

(72) Inventors: Theo Kevin Gauthier, Tokyo (JP); Robin Salen, Tokyo (JP); Jawad Tariq, Tokyo (JP)

(73) Assignee: ToposWare, Inc., Tokyo-to (JP)

( * ) Notice: Subject to any disclaimer, the term of this patent is extended or adjusted under 35 U.S.C. 154(b) by 274 days.

(21) Appl. No.: 17/357,959

(22) Filed: Jun. 24, 2021

(65) Prior Publication Data
US 2022/0014502 A1 Jan. 13, 2022

Related U.S. Application Data (60) Provisional application No. 63/050,355, filed on Jul. 10, 2020.

(51) Int. Cl.
| | | |
|---|---|---|
| *H04L 29/06* | (2006.01) | |
| *H04L 9/40* | (2022.01) | |
| *G06F 16/23* | (2019.01) | |
| *H04L 9/30* | (2006.01) | |
| *H04L 9/32* | (2006.01) | |
| *H04L 9/06* | (2006.01) | |
| *H04L 9/00* | (2022.01) | |

(52) U.S. Cl.
CPC ...... *H04L 63/0421* (2013.01); *G06F 16/2379* (2019.01); *H04L 9/30* (2013.01); *H04L 9/3218* (2013.01); *H04L 9/0643* (2013.01); *H04L 9/50* (2022.05)

(58) Field of Classification Search
CPC ..... H04L 63/0421; H04L 9/30; H04L 9/3218; H04L 9/50; H04L 9/0643; G06F 16/2379
See application file for complete search history.

(56) References Cited

U.S. PATENT DOCUMENTS

2017/0293912 A1* 10/2017 Furche ............... G06Q 20/3825
2019/0164153 A1* 5/2019 Agrawal ............. G06Q 20/383

OTHER PUBLICATIONS

Jivanyan, A.,"Lelantus: A New Design for Anonymous and Confidential Cryptocurrencies," lelantus.io, 2019, 30 pages.

\* cited by examiner

*Primary Examiner* — Malcolm Cribbs
(74) *Attorney, Agent, or Firm* — Fenwick & West LLP (57) ABSTRACT

Disclosed is a mechanism for performing an anonymous transfer using a blockchain. A sender's device generates a commitment based on a serial number of a zero-knowledge token and a value of the zero-knowledge token. Moreover, the sender's device generates a range proof and a balance proof for the commitment. The range proof verifies that the value of the zero-knowledge token is within a preset range. The balance proof verifies that the value of a set of input tokens is greater than or equal to the value of the zero-knowledge token. The sender's device sends a conversion request to the blockchain network. The conversion request consumes the set of input tokens and generates the zero-knowledge token. The conversion request includes the generated commitment, the generated range proof, and the generated balance proof.

20 Claims, 9 Drawing Sheets

BLOCKCHAIN-BASED ANONYMOUS TRANSFERS ZERO-KNOWLEDGE PROOFS

CROSS REFERENCE TO RELATED APPLICATIONS

This application claims the benefit of U.S. Provisional Application No. 63/050,355, filed Jul. 10, 2020, which is incorporated by reference in its entirety.

TECHNICAL FIELD

The disclosure generally relates to the field of encryption.

BACKGROUND

Various messaging applications exist today. The more secure messaging applications use end-to-end encryption to secure communications not only "in transit" but also on third-party storage to provide confidentiality. Although the content of the communication is protected, some sender and recipient information is known to a third-party providing a platform to exchange messages, thus, the third party is in possession of information (e.g., metadata) about the sender and the recipient being in contact. That is the third-party has access to data about the chat or email as opposed to their contents. That information may be very valuable itself. As a result, the third-party is able to provide sender and recipient information to others (e.g., through giving backdoor access to the information), which may be undesirable in many instances.

SUMMARY

Disclosed is a mechanism for performing an anonymous transfer using a blockchain. A sender's device generates a commitment based on a serial number of a zero-knowledge token and a value of the zero-knowledge token. Moreover, the sender's device generates a range proof and a balance proof for the commitment. The range proof verifies that the value of the zero-knowledge token is within a preset range. The balance proof verifies that the value of a set of input tokens is greater than or equal to the value of the zero-knowledge token. The sender's device sends a conversion request to the blockchain network. The conversion request consumes the set of input tokens and generates the zero-knowledge token. The conversion request includes the generated commitment, the generated range proof, and the generated balance proof.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
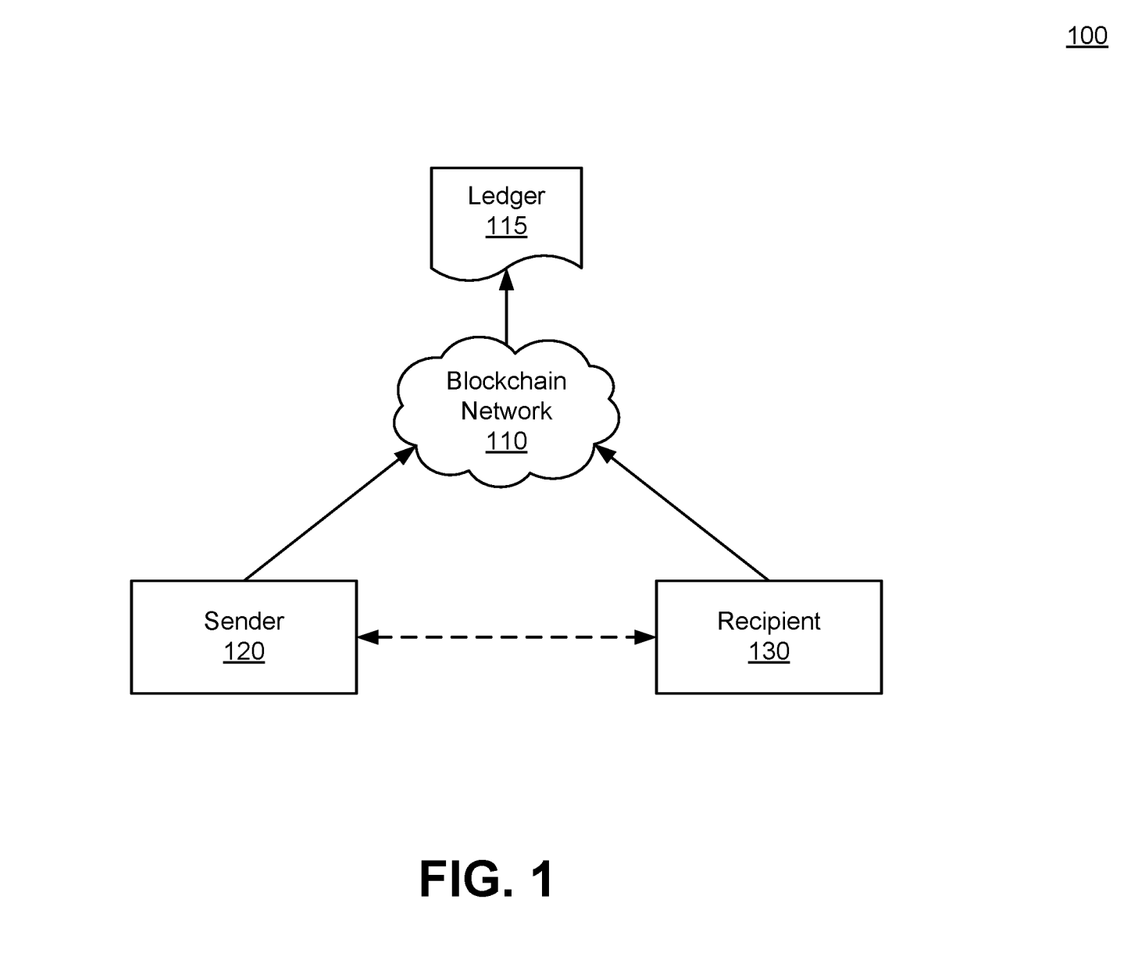
FIG. 1 illustrates a block diagram of a system environment 10 for sending or receiving tokens associated with a blockchain 110, according to one or more embodiments.

Figure (FIG. 1 illustrates a block diagram of a system environment 10 for sending or receiving digital tokens (such as a digital coin or a digital asset) associated with a blockchain 110, according to one or more embodiments. The system environment 110 includes a blockchain network 110, a sender 120, and a recipient 130. Although the example of FIG. 1 shows one sender 120 and one receiver 130, it is understood that the system environment 100 may include any number of senders and receivers.

The blockchain network 110 is a set of computing devices collectively adhering to a protocol for inter-node communication and validation of data to be published in the ledger 115. The ledger is a growing list of records (or blocks) that are linked using cryptography. In some embodiments, the ledger includes a list of transactions for a set of tokens or assets being tracked by the blockchain network 110.

In some embodiments, the ledger 115 of the blockchain network 110 keeps track of a set of transparent tokens and a set of zero-knowledge (zk) tokens. The set of transparent tokens are tracked by storing information about the owner (e.g., information about a digital wallet) of each of the transparent tokens and the value of the of the transparent tokens. When a transparent token is transferred between a sender and a recipient, information about the sender and the recipient and the value of the tokens being transferred is recorded in the ledger 115. The validity of a transfer of transparent tokens is verified by confirming that the sender is in possession of the key (secret information) associated with the transparent token. For example, the sender signs the transaction using a private key associated with the transparent token or wallet containing the transparent token.

The zk-tokens are generated by converting transparent tokens into zk-tokens. For example, a user spends a specific value of transparent tokens to obtain a set of zk-tokens having the same value as the transparent tokens spent for obtaining the zk-tokens. The zk-tokens are also tracked by the ledger 115. However, the ledger 115 does not keep track of ownership of the zk-token, or the source of the zk-token. Moreover, in some embodiments, the ledger 115 does not keep track of the value of each zk-token. Instead, transactions involving zk-tokens are validated using zero-knowledge proofs to verify that a user spending a zk-token is authorized to use the zk-tokens and that the value of the zk-token being spent is the correct amount. For example, in order to validate the spending of a zk-token, the user spending the zk-token provides a zero-knowledge proof that the user knows a secret value associated with the zk-token without revealing the secret value. In some embodiments, the parameters of a zk-token (such as parameters relating to the value of the zk-token and a key for spending the zk-token) are stored in a commitment (such as a Pedersen commitment) that is recoded in the ledger YY15 of the blockchain YY10.

In some embodiments, a commitment is a cryptographic algorithm that allows a user to commit to one or more specific values while keeping the values hidden to others. The commitment allows the user to subsequently prove to others that a specific value is the same value that was previously recorded in the commitment. In other words, the commitment prevents a user from changing the parameters of a zk-token (without revealing the parameters themselves) once the commitment has been recorded in the ledger. At a later point in time, when the user attempts to spend the zk-token, the commitment can be used to verify the parameters of the zk-token.

The sender 120 is an entity that has one or more tokens associated with the blockchain network 110. The sender 120 communicates with the blockchain network 110 to transfer (or send) one or more of the tokens owned by the sender 120 to a recipient 130. In some embodiments, the sender 120 and the recipient 130 are also able to communicate with each other through a private communication channel that is separate from the blockchain 110. In another embodiments, the sender 120 and the recipient 130 are able to communicate with each other in an encrypted way using a protocol set by the blockchain network 110.

Mechanism Overview

Figure 2:
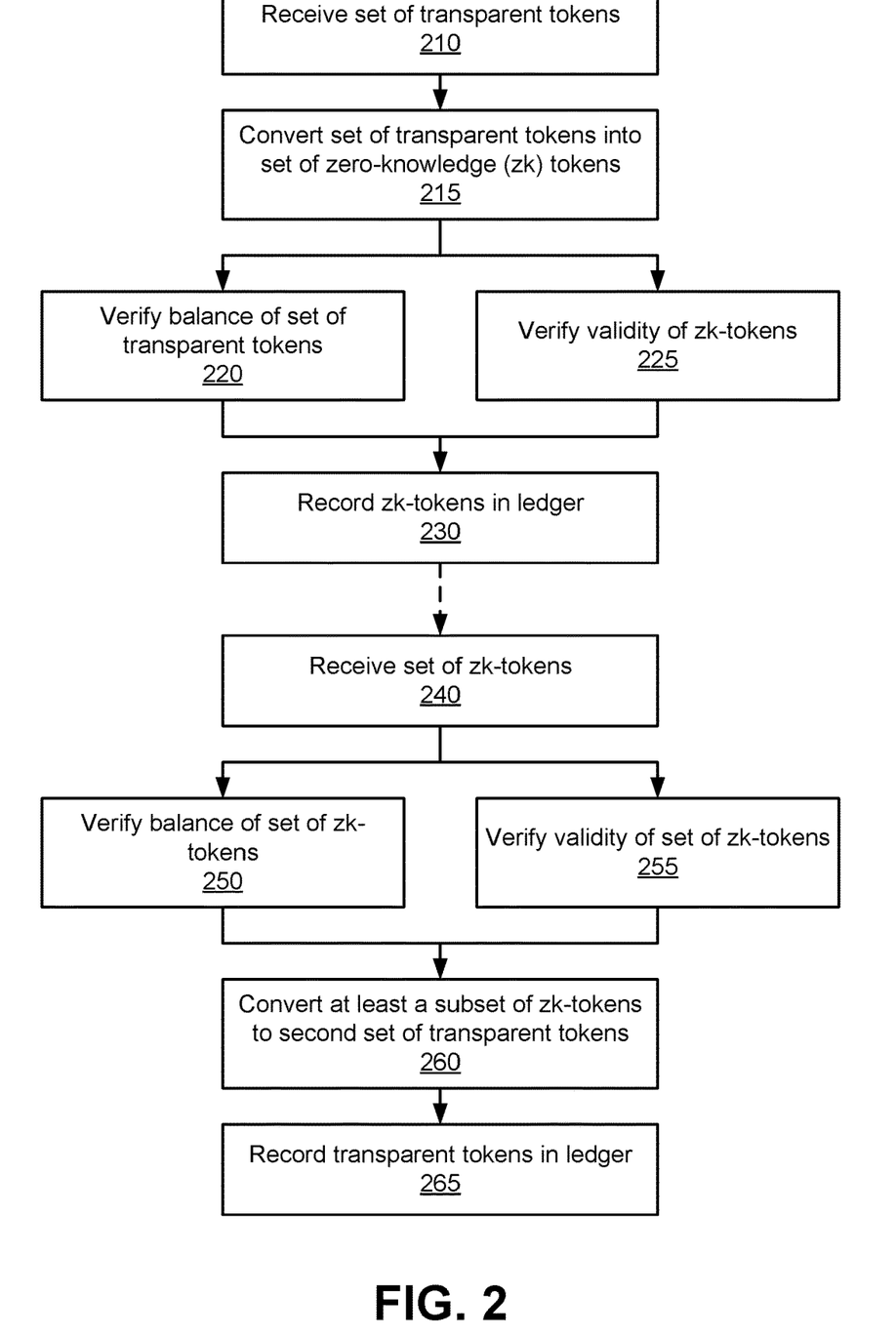
FIG. 2 is a flow diagram of a system for anonymously transferring tokens between a sender 120 and a recipient, according to one or more embodiments.

FIG. 2 is a flow diagram of a system for anonymously transferring tokens between a sender 120 and a recipient 130, according to one or more embodiments.

A set of transparent tokens is received 210 and converted 215 into a set of zk-tokens. In some embodiments, to convert the transparent tokens into zk-tokens, a set of commitments to the transparent tokens are generated. A commitment locks the set of parameters associated with a zk-token without revealing the actual value for the set of parameters. Instead, a user is able to prove the accuracy of the parameter used for a zk-token using the commitment. In some embodiments, the commitment C is generated as $$C = \text{Comm}(S, V, R) = g^S h_1^V h_2^R$$

Where S is the serial number of the zk-token, V is the value of the zk-token, R is a random number, and g, $h_1$ and $h_2$ are constant values. Moreover, the serial number S is generated by generating a private key q and a corresponding public key $Q=g^q$, and hashing the public key Q. That is, the serial number S is generated as $$S = \text{Hash}(Q)$$

The balance of the set of transparent tokens is verified 220. The blockchain network 110 verifies that the value of the transparent tokens is sufficient for generating the zk-tokens. In some embodiments, the balance of the set of transparent tokens is verified to confirm that the total value of the set of transparent tokens matches the total value of the set of zk-tokens. Moreover, a zero-knowledge proof may be used to verify the balance of the transparent tokens. That is, the total value of the zk-tokens is confirmed to match the total value of the transparent tokens without revealing the value of each individual zk-token. In some embodiment, to prove that the balance of the transparent tokens is sufficient for the set of zk-tokens being generated, a range proof for the zk-tokens is provided by the sender 120.

Additionally, the validity of the zk-tokens is verified 225. In some embodiments, the zero-knowledge proof is provided to verify that the sender 120 is in possession of the serial number S and the random number R without revealing the serial number S and the random number R. For instance, to verify the validity of the zk-tokens, a Schnorr proof on $$\frac{c}{h_1^V} = g^S H_2^R$$

is provided by the sender 120. Moreover, in some embodiments, the validity of the value V is also verified without revealing the value V. For instance, a zero-knowledge proof that verifies that the value V of a commitment is not a negative value is used to confirm the validity of the commitment C.

If the validity of the zk-tokens and the balance of the transparent tokens are verified, the newly generated zk-tokens are recorded 230 in the ledger. In some embodiments, information about the newly generated zk-tokens such as the commitment C for each of the zk-tokens is stored in the ledger. In some embodiments, the ledger additionally stores the spending of the transparent tokens used for generating the zk-tokens.

Once the sender 120 has a set of zk-tokens, the sender 120 is able to send a set of tokens to a recipient 130. In some embodiments, the sender 120 can send the zk-tokens to the recipient 130 and the recipient is able to spend the zk-tokens using the private data received from the sender 120. Alternatively, the sender 120 spends the zk-tokens to generate transparent tokens and sends the transparent tokens to the recipient 130.

To spend a set of zk-tokens, a set of zk-tokens are received 240. In some embodiments, to spend the zk-tokens, the spending user reveals the serial number S for the zk-tokens to be spent. The balance of the set of zk-tokens is verified 250 and the validity of the zk-tokens is verified 255. In some embodiments, to verify the balance of the zk-tokens, a zero-knowledge proof is provided by spending user. The zero-knowledge proof verifies that the value of the zk-token is within a specific range without revealing the value of the zk-token. Moreover, to prove the validity of the zk-token, the spending user provides a zero-knowledge proof that the serial number S is in the set of zk-tokens.

If the validity and the balance of the zk-tokens are verified, at least a portion of the zk-tokens is converted 260 into a set of transparent tokens and the set of transparent tokens are recorded in the ledger 115.

Zk-Token Generation Details

Figure 3:
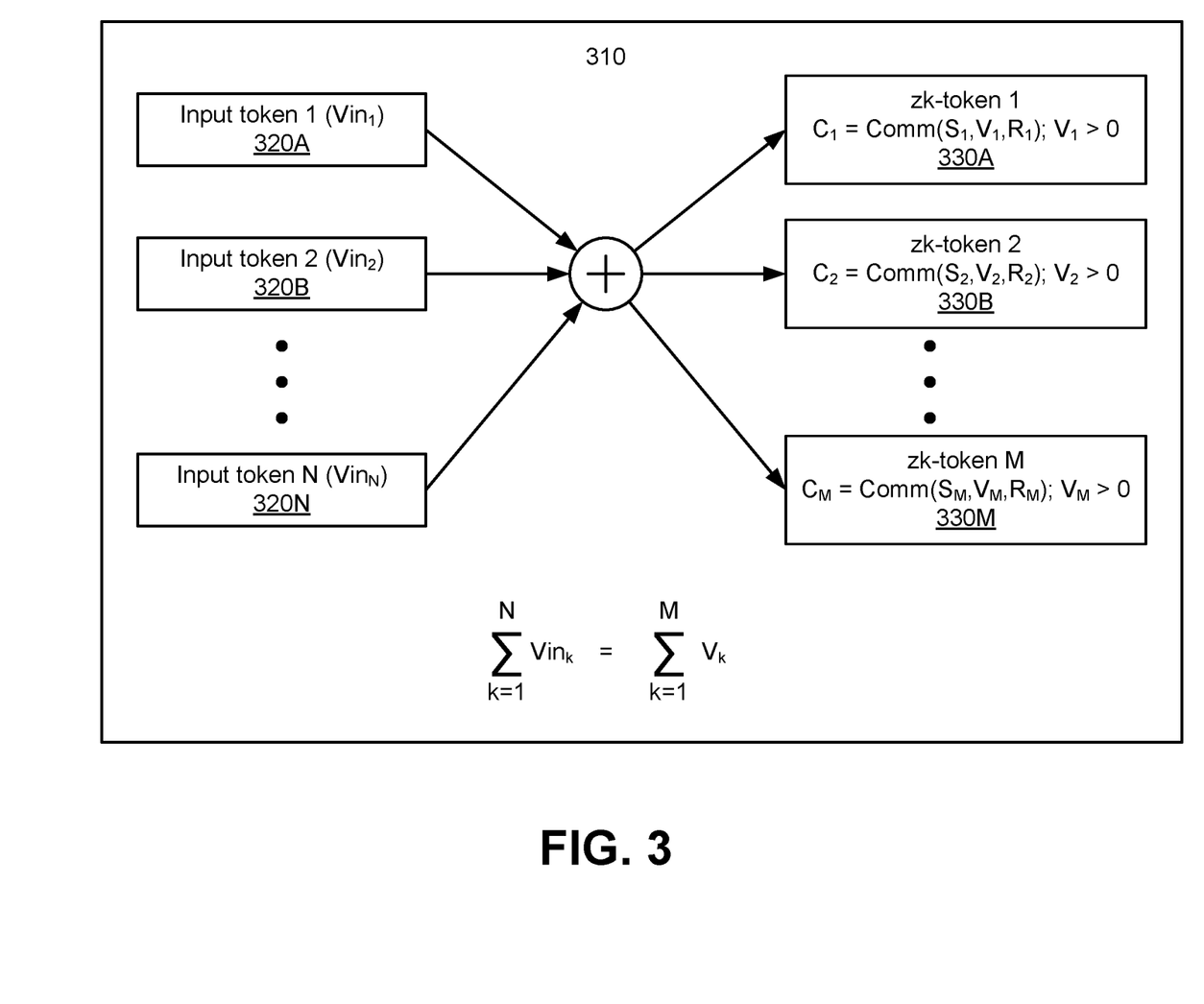
FIG. 3 illustrates a block diagram of token conversion transaction, in accordance with one or more embodiments.

FIG. 3 illustrates a block diagram of a token conversion transaction, in accordance with one or more embodiments. In some embodiments, the conversion transaction is a zk-token generation transaction or a zk-token minting transaction. In the conversion transaction 310 of FIG. 3, a set of N input tokens 320A through 320N are converted into a set of M zk-tokens 330A through 330M. Each of the zk-tokens has a corresponding commitment C storing a serial number S, a value V, and a random number R. However, a third-party entity is unable to derive the parameters for a specific zk-token from the corresponding commitment C. Moreover, as shown in FIG. 3, the total value of the input tokens matches the total value of zk-tokens being generated. That is:

$$\sum_{k=1}^{N} Vin_k = \sum_{k=1}^{M} V_k$$

To generate the commitment C, a set of constant values (g, $h_1$ and $h_2$) are generated. In some embodiments, the constant values are generated from a group G. The group G may be a large abelian group generated using predetermined curve or algorithm, such as secp256k1. In some embodiments, one or more of the constant values used for generating the commitment C is known by other entities in the blockchain network 110. In some embodiments, the constants are generated using a deterministic algorithm, or a randomizing algorithm. For example, one or more of the constant values may be generated using a hashing algorithm (such as SHA-256). For instance, the constant $h_1$ is generated by hashing the constant g, and the constant $h_2$ is generated by hashing the constant $h_1$. As such, the constants $h_1$ and $h_2$ are deterministically generated using a randomizing function. That is, although the constant $h_2$ is generated based on the constant $h_1$, the constant $h_1$ cannot be determined from the constant $h_2$. Similarly, although the constant $h_1$ is generated based on the constant g, the constant g cannot be determined from the constant $h_1$.

Based on the constant values, a commitment C is generated. In some embodiments, the commitment is generated as $$C=\text{Comm}(S,V,R)=g^S h_1^V h_2^R$$

Where S is a serial number, V is the value for the commitment, and R is a randomizing value. In some embodiments, the serial number S is a plain text serial number. In other embodiments, the serial number is hidden. For example, the serial number S may be hashed to hide the plain text value.

In some embodiments, the serial number S is generated from a spending key q and a corresponding public key Q. For instance, the public key Q is generated from the spending key q. In some embodiments, the public key is generated as:

$$Q=g^q$$

The serial number S is then generated from the public key Q. In some embodiments, the serial number is generated using a predetermined algorithm. Moreover, the serial number S is generated using a randomizing algorithm. In some embodiments, the serial number S is generated as:

$$S=\text{Hash}(Q)$$

In some embodiments, the serial number S is hidden by sampling a random value R (a blinding factor) and locally storing q, V, and R.

Additionally, a set of proofs for confirming the validity of the zk-token is generated. In some embodiments, the proofs provide a confirmation that an entity is in possession of a certain set of data. The set of proofs are zero-knowledge proofs that a verifying can process to confirm the validity of commitment.

In some embodiments, the set of proofs includes a range proof for verifying that the value V of the commitment C is within a valid range (e.g., that the value V is a positive value), without revealing the value V to the verifier. For example, the range proof may be used for verifying that the value V of the commitment C is within a range $[0, 2^k-1]$.

In some embodiments, the set of proofs additionally includes a proof of knowledge (such as a Schnorr proof) for verifying knowledge of one or more parameters associated with the commitment C without revealing those parameters. For example, a knowledge proof on $$\frac{c}{h_1^V} = g^S h_2^R$$

is generated. In some embodiments, to generate the proofs, the prover selects or generates a randomness r, receives a challenge x, and generates a proof based on the randomness r, the challenge x, and the value being verified $g^S h_2^R$. Specifically, the knowledge proof is used to verify that the prover has knowledge of the exponents S and R of the value $g^S h_2^R$.

The commitment is then recorded in the ledger and one or more transparent tokens are consumed. In some embodiments, the number of transparent tokens consumed is equal or greater than the value V corresponding to the commitment. As such, no additional value is created when the zk-token is generated. Instead, to obtain a zk-token having a value V, at least the same amount of transparent tokens is spent. In some embodiments, the commitment C is stored in a commitment list CMList. The CMList includes a set of commitments, each having an index i. For example, a user generating zk-tokens may generate a set of N commitments, each having a different serial number $S_i$, a value $V_i$, and a random number $R_i$. The set of N commitments are then stored in a commitment list CMList and the CMList is recorded in the ledger. Alternatively, the CMList includes commitments generated by different users. For example, multiple users may generate zk-tokens, each having a corresponding serial number S, value V, and random number R.

Each commitment C stores the information related to a zk-token in the ledger. Although entities accessing the commitment C are unable to derive the private information (such as the serial number S and the value V) for the zk-token, the third party is able to verify its validity using the range proof and the knowledge proof provided by the entity generating the zk-token. Moreover, since the commitment C is stored in the ledger, the owner of the zk-token is unable to change the private information. That is, the owner of the zk-token is unable to purport that the value V of the commitment is something different than the value used to generate the commitment as the owner would be unable to provide a valid proof for the commitment unless the correct value V is used.

Zk-Token Spending

Figure 4:
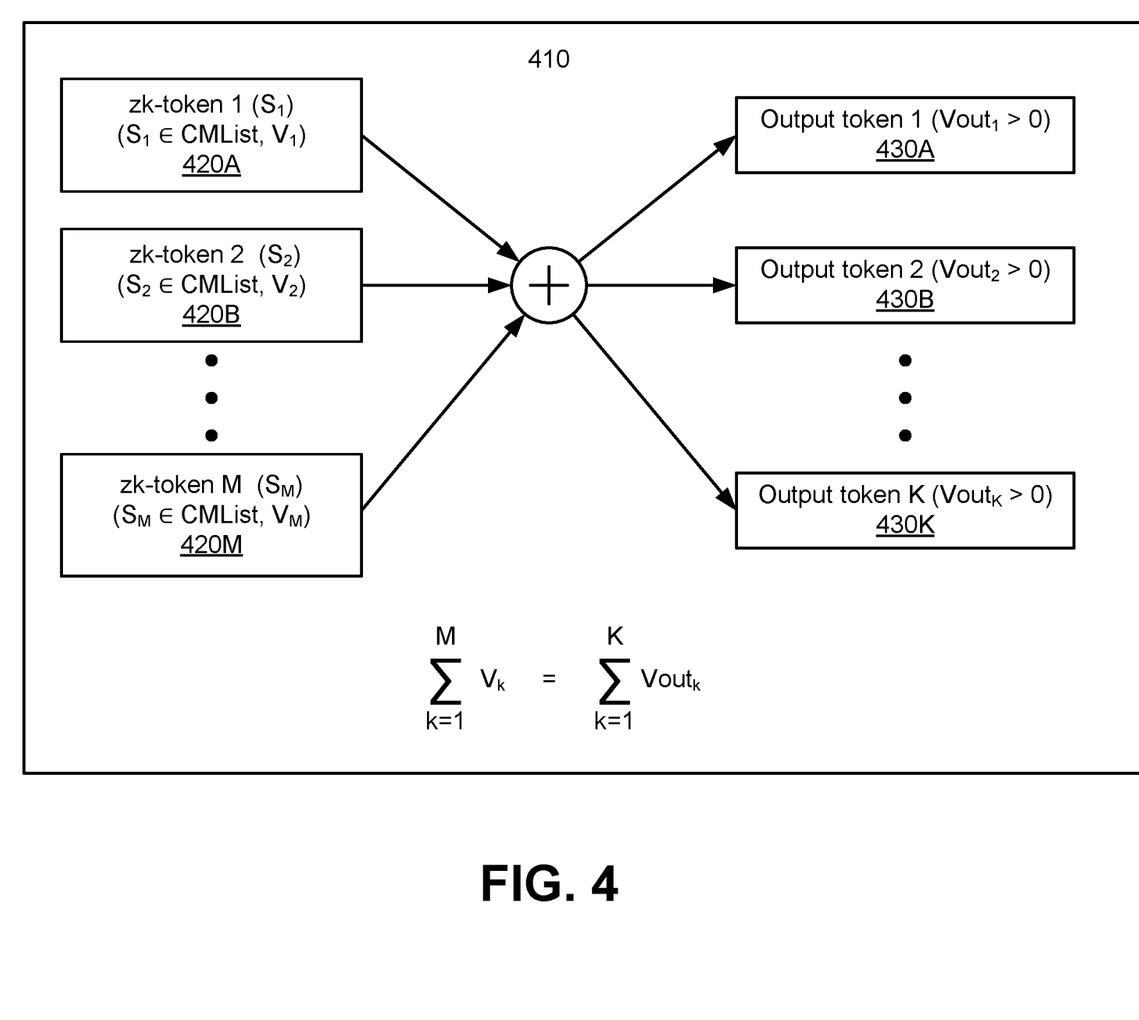
FIG. 4 illustrates a block diagram of a zk-token spending transaction, in accordance with one or more embodiments.

FIG. 4 illustrates a block diagram of a zk-token spending transaction, in accordance with one or more embodiments. In the spending transaction 410 of FIG. 4, a set of N zk-tokens 420A through 420N are spent to generate a set of K output tokens 430A through 430K. As shown in FIG. 4, the total value of zk-tokens being spent matches the total value of output tokens. That is:

$$\sum_{k=1}^{M} V_k = \sum_{k=1}^{K} Vout_k$$

To spend the zk-tokens, the blockchain network 110 verifies the existence of the zk-token, the validity of the zk-token, and the balance of the zk-token to be spent. In some embodiments, one or more of these verifications are performed using zero knowledge proofs.

First, to spend a zk-token, the spending user reveals the serial number S of the token to be spent. That is, the spending user lists the serial numbers S of each of the zk-tokens being spent in the spending transaction 410. In some embodiments, the blockchain network 110 verifies that the serial number $S_o$ has not been spent yet. That is, the blockchain network verifies that a user has not successfully spent a zk-token having the serial number $S_o$ in the past (e.g., by verifying that the ledger does not include a zk-token spending transaction with the serial number $S_o$ of the zk-token being spent).

Once the blockchain network 110 has verified that a zk-token having a serial number $S_o$ has not been spent in the past the blockchain network 110 verifies that the CMList contains a commitment having the serial number $S_o$. However, without revealing other information about the zk-token (such as the value V or the random number R), the blockchain network 110 is unable to determine which commitment $C_o$ in the CMList corresponds to the serial number $S_o$. Here, the spending user provides a zero-knowledge proof that one of the commitments in the CMList corresponds to the serial number $S_o$ without revealing information about the commitment $C_o$ or identifying the commitment $C_o$. That is, the spending user provides a proof that the commitment list CMList includes the commitment $C_o$ having a serial number $S_o$ without revealing the value of the commitment $C_o$, the index of the commitment $C_o$ within the commitment list CMList, or without revealing private information about the commitment $C_o$ (such as the value $V_o$ or the random number $R_o$ used for generating the commitment $C_o$).

In some embodiments, to verify the that the commitment list CMList includes the commitment $C_o$ having the serial number $S_o$, a new commitment list CMList' is generated by subtracting the serial number $S_o$ from every commitment in the commitment list CMList'. That is, the new commitment list CMList' is generated as:

$$CMList' = \{Comm(S_1, V_1, R_1) - Comm(S_o, 0, 0); Comm(S_2, V_2, R_2) -$$

$$Comm(S_o, 0, 0); \ldots ; Comm(S_N, V_N, R_N) - Comm(S_o, 0, 0)\}$$

$$= \{Comm(S_1 - S_o; V_1, R_1); Comm(S_2 - S_o; V_2, R_2); \ldots ;$$

$$Comm(S_N - S_o; V_N, R_N)\}$$

from a commitment list CMList:

$$CMList = \{Comm(S_1, V_1, R_1); Comm(S_2, V_2, R_2); \ldots ; Comm(S_N, V_N, R_N)\}$$

Then, the spending user verifies, using a zero-knowledge proof, that one of the commitments in the new commitment list CMList' has a serial number of 0. That is, the spending user provides a proof that one of the commitments in the new commitment list CMList' is of the form $Comm(0, V_o, R_o)$ without revealing the value $V_o$ or the random number $R_o$. In some embodiments, to prove that one of the commitments in the new commitment list CMList' has a serial number of 0, the spending user provides a 1-out-of-N proof.

In addition to verifying that the CMList includes a commitment with a serial number $S_o$ and that the commitment with serial number $S_o$ has not been spent, the blockchain network 110 verifies that the total value of input tokens matches the total value of output tokens. In some embodiments, the blockchain network 110 verifies that the total value of input tokens matches the total value of output tokens without revealing the values of any of the input tokens or output tokens, and without revealing the total value of input tokens or output tokens. In some embodiments, the output tokens are a combination of zk-tokens and transparent tokens. In this embodiment, the total value of output tokens is verified without revealing the value of any of the output zk-tokens or the total value of the output zk-tokens.

Moreover, the blockchain network 110 verifies that the spending user possesses the private key for spending the zk-token. That is, for each zk-token to be spent, the blockchain network 110 verifies that the user spending the zk-token has knowledge of the private key $q_o$ corresponding to the serial number $S_o$=hash($Q_O$). To verify that the user spending the zk-token has knowledge of the private key q, the spending user provides the public key $Q_o$ and signs the transaction using the private key q. The blockchain network is then able to verify that the serial number S does correspond to the public key $Q_o$ (e.g., by hashing the public key $Q_o$), and verifies that the signature is valid (e.g., using the public key $Q_o$).

If the blockchain network 110 verifies that the commitment with serial number $S_o$ is valid and has not yet been spent, that the balance of input tokens matches the value of output tokens, and that the spending user has the private key $q_o$ corresponding to the serial number $S_o$, the blockchain network 110 accepts the transaction and records the spending of the zk-tokens in the ledger 115.

Anonymous Transfers Using Zero-Knowledge Proofs

The mechanism illustrated in FIG. 2 may be used for performing various types of transactions anonymously within the blockchain network 110. For example, the mechanism illustrated in FIG. 2 may be used for transferring transparent tokens from a sender to a recipient without revealing the source (i.e., without revealing the input tokens). In another example, the mechanism illustrated in FIG. 2 may be used for generating zk-tokens for a recipient. In yet another example, the mechanism illustrated in FIG. 2 may be used for communicating a secret message from a sender to a recipient without revealing the identity of the recipient.

Anonymous Transfer of Transparent Tokens

Figure 5A:
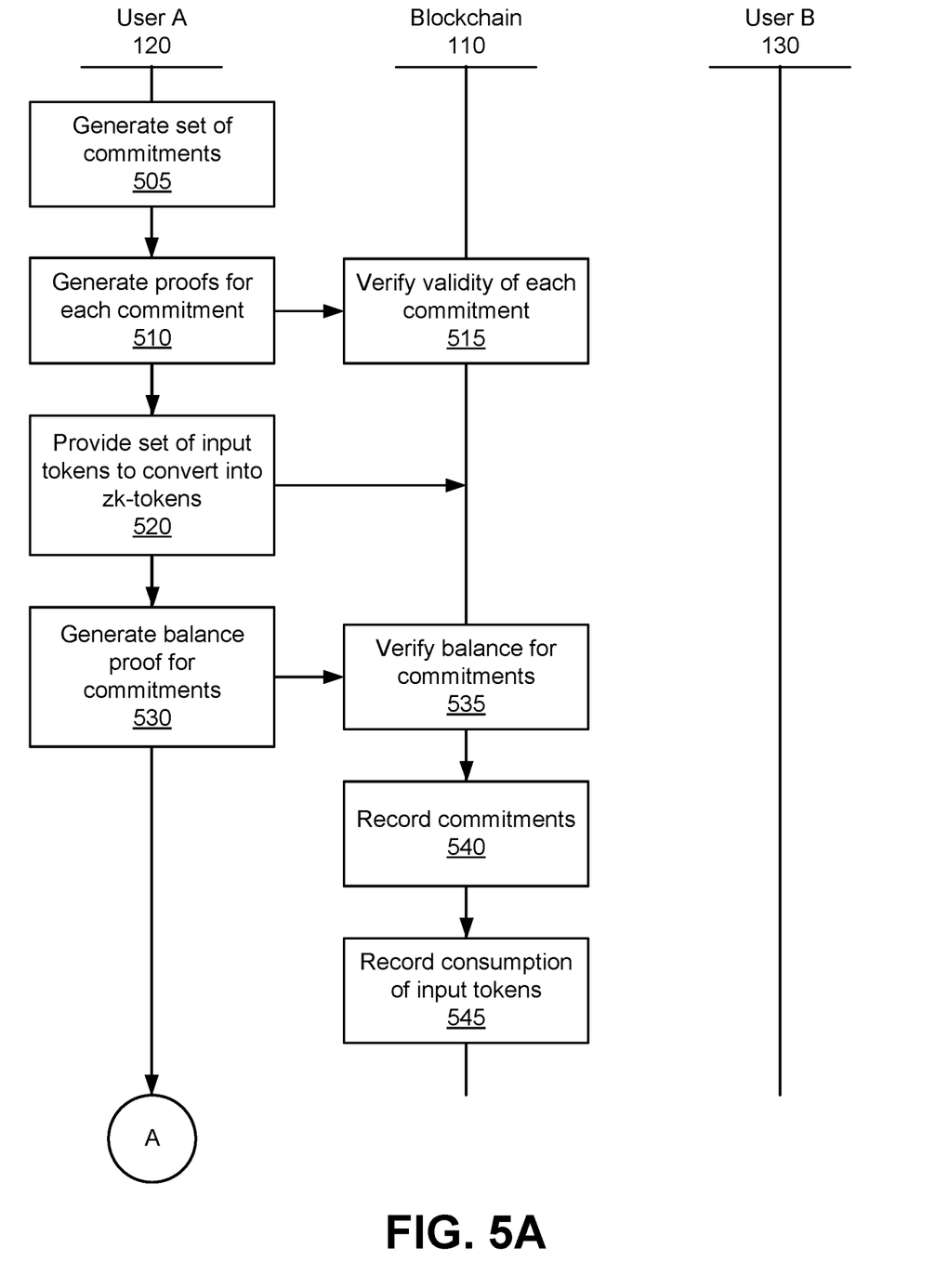
FIG. 5A illustrates a flow diagram for converting a set of input tokens into a set of zk-tokens, according to one or more embodiments.
Figure 5B:
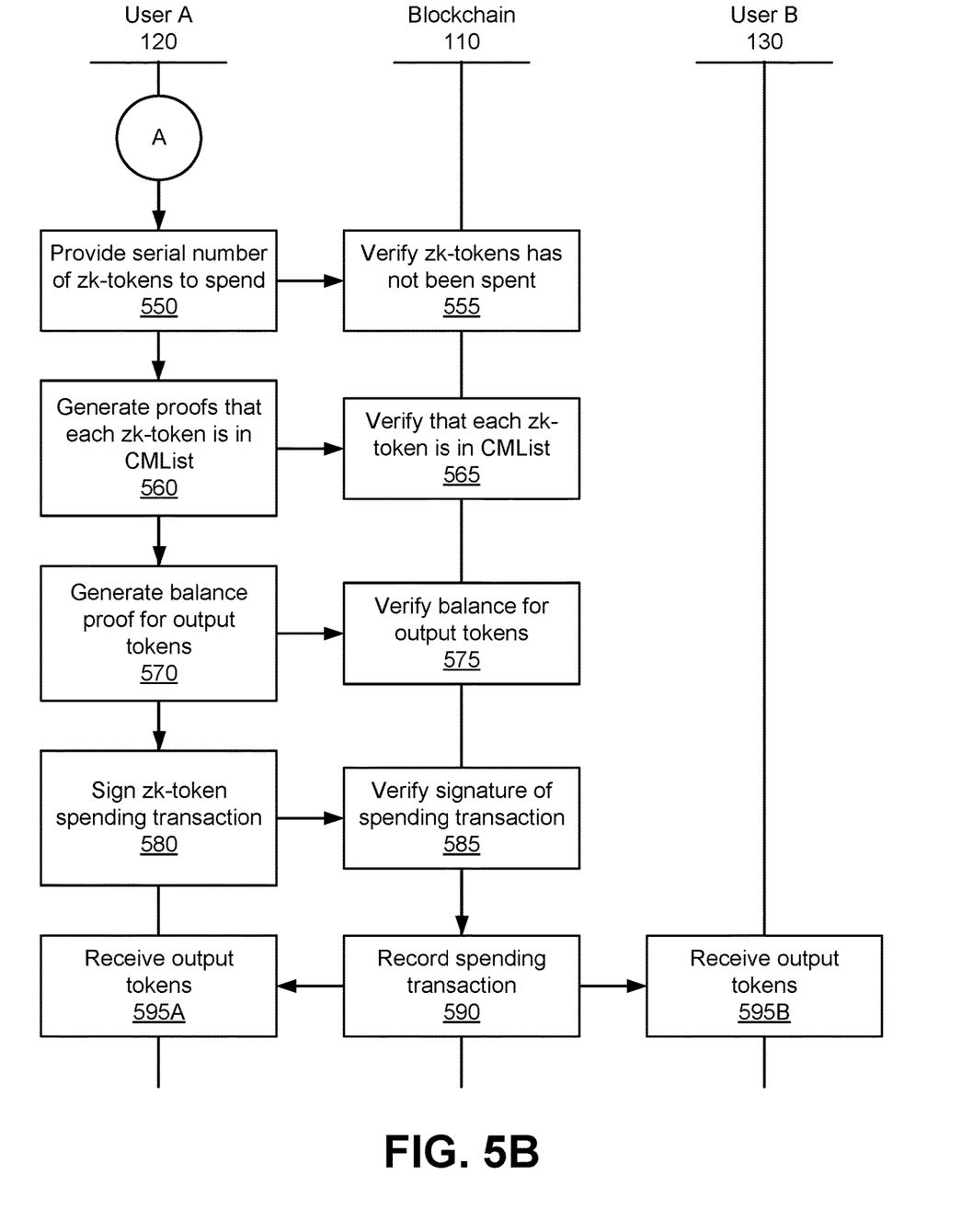
FIG. 5B illustrates a flow diagram for spending zk-tokens to provide one or more output tokens to a recipient, according to one or more embodiments.

FIGS. 5A and 5B illustrates a flow diagram for anonymously transferring transparent tokens, in accordance with one or more embodiments. Specifically, FIG. 5A illustrates a flow diagram for converting a set of input tokens into a set of zk-tokens, in accordance with one or more embodiments. FIG. 5B illustrates a flow diagram for spending zk-tokens to provide one or more output tokens to a recipient 130, in accordance with one or more embodiments.

A first user 120 (such as a sender or payer) generates 505 a set of commitments C. Each commitment corresponds to a zk-token having a serial number S, and a value V. The first user 120 generates 510 one or more proofs for each commitment C. For example, for each commitment, the first user 120 generates a range proof for proving that each of the commitments has a positive value V. Additionally, for each commitment, the first user 120 generates a knowledge proof for verifying that the first user has knowledge of the values used for generating the commitment. The first user 120 provides the commitments to the blockchain network 110 and the blockchain zk-tokens 110 verifies 515 the proofs for each of the commitments C.

The first user provides 520 a set of input tokens to be converted into the set of zk-tokens. Moreover, the first user generates a balance proof for proving that the total value of the input tokens is sufficient for generating the set of zk-tokens. In some embodiments, the balance proof verifies that the total value of input tokens is equal to the total value of zk-tokens. In other embodiments, the balance proof verifies that the total value of input tokens is equal or greater than the total value of zk-tokens. The first user sends the balance proof to the blockchain network 110 and the blockchain network 110 verifies 535 that the total value of input tokens is sufficient for generating the zk-tokens associated with the commitments C.

If the blockchain successfully verifies the validity of each commitment and the sufficiency of the total value of input tokens, the blockchain records 540 the commitments C and records 545 the consumption of the input tokens.

In some embodiments, one or more of the set of commitments, the knowledge proofs, the range proofs, and the balance proofs are transmitted by the client device of the first user 120 in a token conversion request. In some embodiments the token conversion request includes a series of messages between the first user 120 and the blockchain network 110.

Once the commitments C are recorded in the ledger 115, the zk-tokens associated with each of the commitments can be spent. In some embodiment, to spend a set of zk-tokens, the first user sends a spending request to the blockchain network 110. The spending request may include a spending transaction record. To spend a set of zk-tokens, the first user 120 provides 550 the serial number S of the zk-tokens to be spent to the blockchain network 110. In some embodiments, the serial numbers of the zk-tokens being spent are included in the spending transaction record sent by the first user 120 to the blockchain network 110 as part of the spending request. In some embodiments, the blockchain network 110 verifies 555 that each of the serial numbers provided by the first user have not been spent in the past. For example, the blockchain reviews the ledger to confirm that each of the serial numbers S provided by the first user 120 are not included in previous zk-token spending transactions.

Moreover, for each of the zk-tokens being spent, the first user generates 560 a proof that a commitment associated with the zk-token is included in a commitment list CMList. For each serial number $S_j$, the first user 120 generates a 1-out-of-N proof for verifying that the a commitment $C_i$ having the serial number $S_i$ is in the commitment list CMList without revealing which commitment corresponds to the serial number $S_j$. The first user 120 provides the 1-out-of-N proofs to the blockchain network 110 and the blockchain network 110 verifies 565 the commitment list CMList includes a commitment having each of the serial numbers provided by the first user 120.

The first user 120 generates 570 a balance proof for verifying that to total value of zk-tokens being spent sufficient for the set of output tokens. In some embodiments the first user 120 provides a set of output tokens to be generated from the set of zk-tokens. In some embodiments, the output tokens are included in the spending transaction record sent by the first user 120 to the blockchain network 110 as part of the spending request. The set of output tokens may include one or more transparent tokens and one or more zk-tokens. In some embodiment, the balance proof verifies that the total value of zk-tokens being spent is equal to the total value of output tokens. In other embodiments, the balance proof verifies that the total value of zk-tokens is equal or greater than the total value of output tokens. The first user sends the balance proof to the blockchain network 110 and the blockchain network 110 verifies 575 that the total value of zk-tokens is sufficient for generating the output tokens.

The first user signs 580 the spending transaction record using the private key corresponding to the serial numbers of each of the zk-tokens being spent. Once the blockchain has verified the validity of each of the zk-tokens being spent and has verified the balance of the zk-tokens being spent, the blockchain network 120 verifies the signature of the spending transaction record. Once the blockchain network 110 has finished verifying the transaction, the blockchain network 110 records 590 the spending transaction. In some embodiments, the spending transactions consumes the input zk-tokens and generates the output tokens. Once the spending transaction has been recorded, users are able to spend the output tokens included in the spending transaction record.

In some embodiments, one or more users receive 595B one or more of the output tokens from the spending transaction. For example, a second user 130 (such as a recipient or payee) receives one or more output tokens of the recorded spending transaction. In some embodiments, the first user includes a transparent token generated using a public key of the second user 130 in the spending transaction. The second user can then spend the transparent token using a private key associated with the public key used for generating the transparent token. In another example, the first user 120 receives 595A one or more output tokens back. For example, the first user 120 receives a set of output zk-tokens or a set of output transparent tokens included in the recorded spending transaction.

Anonymous Transfer of Zk-Tokens

Figure 6A:
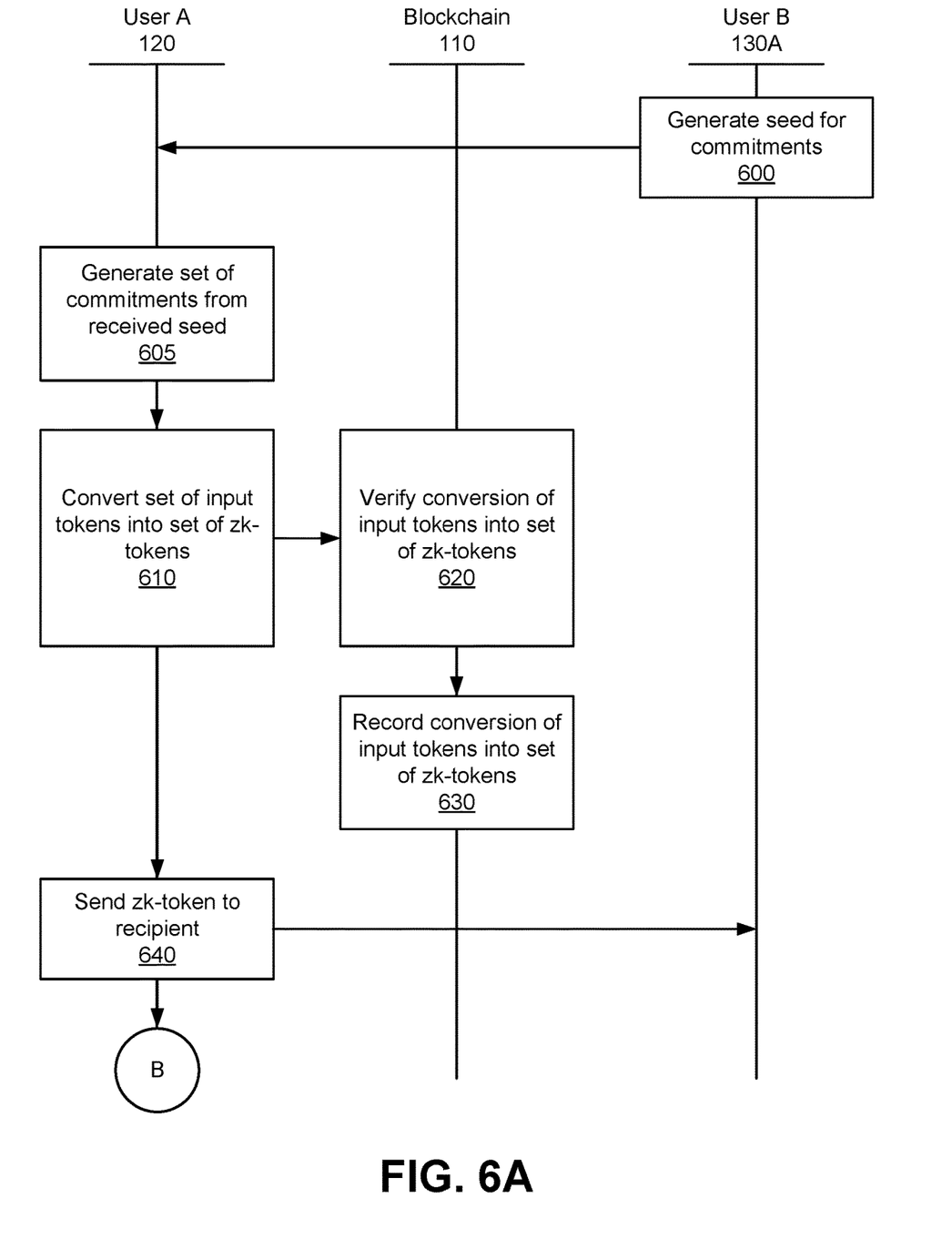
FIG. 6A illustrates a flow diagram for converting a set of input tokens into a set of zk-tokens based on a seed provided by a recipient, according to one or more embodiments.
Figure 6B:
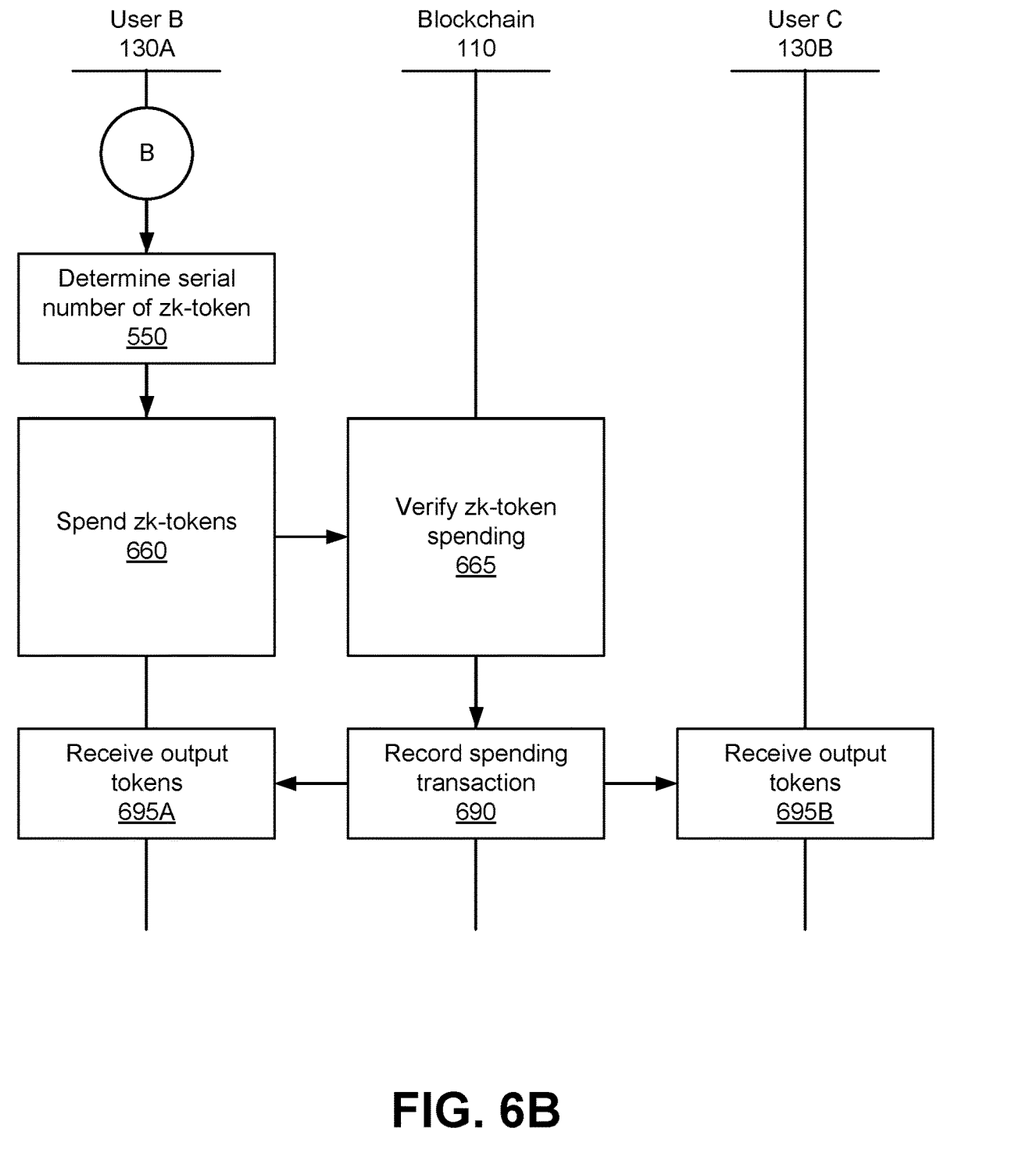
FIG. 6B illustrates a flow diagram for spending zk-tokens to provide one or more output tokens to a recipient, according to one or more embodiments.

FIGS. 6A and 6B illustrates a flow diagram for anonymously transferring zk-tokens, in accordance with one or more embodiments. Specifically, FIG. 6A illustrates a flow diagram for converting a set of input tokens into a set of zk-tokens based on a seed provided by a recipient, in accordance with one or more embodiments. FIG. 6B illustrates a flow diagram for spending zk-tokens to provide one or more output tokens to a recipient 130A, in accordance with one or more embodiments.

A second user 130A (such as a recipient or a payee) generates a seed Q for generating one or more commitments. In some embodiments, to generate the seed Q, the second user 130A generates random numbers x and r, and computes the seed as $$Q = g^x h_2^r$$

The second user provides the seed Q to the first user 120 (such as the sender or payer). In some embodiments, the second user 130A additionally generates a proof of knowledge for the random numbers x and r, and provides the proof of knowledge to the first user 120. The first user 120 can the verify the validity of the seed Q using the proof of knowledge provided by the second user 130A.

The first user then generates 605 one or more commitments C from the seed Q provided by the second user 130A. Each commitment corresponds to a zk-token having a serial number S and value V. In some embodiments, to generate a commitment C, the first user generates a random number y. The first user 120 then computes the commitment as $$C = Q^y h_1^v = g^{xy} h_1^V h_2^{ry}$$

As such, the commitment C has a serial number S=xy.

The first user 120 converts 610 a set of input tokens into a set of zk-tokens. In some embodiment, the first user converts the set of input tokens into a set of zk-tokens using a process similar to the one described in conjunction with FIG. 5A. For example, the first user 120 generates a range proof for the zk-tokens, a knowledge proof for each of the generated commitments, and a balance proof for the set of zk-tokens being generated. The blockchain network 110 verifies 620 the conversion of input tokens into zk-tokens (e.g., by verifying the validity of commitments and balances), and records 630 the conversion of input tokens into zk-tokens. For example, the blockchain network 110 records the commitments corresponding to the zk-tokens being generated, and records the consumption of input tokens used to generate the zk-tokens.

The first user 120 then sends 640 to the second user 13—the zk-tokens generated using the seed provided by the second user. In some embodiments, the first user 120 sends the random number y used to generate the commitment. In some embodiments, the first user 120 additionally sends the value V associated with the zk-token being sent. Since the second user 130A has knowledge of the random numbers x and r used for generating the seed Q, the second user 130A is able to determine the serial number S=xy and random number R=ry for spending the zk-token. However, since the first user 120 does not have knowledge of the random numbers x and r, the first user is unable to spend the generated zk-tokens. Moreover, since the first user 120 does not have knowledge of the random number x, the first user 110 is unable to determine the serial number S=xy for the zk-token that was generated. As such, when the second user 130A spends the zk-token by revealing the serial number S=xy, the first user does not have knowledge that the zk-token being spent corresponds to the commitment that was generated by the first user 120.

To spend the zk-tokens, the second user 130A determines 550 the serial number S=xy of the zk-tokens to be spent and spends 660 the zk-tokens. In some embodiments, the second user spends the zk-tokens using a process similar to the one described in conjunction with FIG. 5B. For example, the second user generates proofs that each zk-token to be spent is in a commitment list CMList and generates a balance proof for the set of output tokens of the spending transaction. The blockchain network 110 verifies 665 the zk-token spending transaction and records 690 the spending transaction.

In some embodiments, one or more users receive 595B one or more of the output tokens from the spending transaction. For example, a third user 130B (such as a recipient or payee) receives one or more output tokens of the recorded spending transaction. In some embodiments, the first user includes a transparent token generated using a public key of the second user 130 in the spending transaction. The second user can then spend the transparent token using a private key associated with the public key used for generating the transparent token. In another example, the first user 120 receives 595A one or more output tokens back. For example, the first user 120 receives a set of output zk-tokens or a set of output transparent tokens included in the recorded spending transaction.

Anonymous Delivery of Secret Messages

In some embodiments, encrypted messages may be exchanged between users using transactions recorded in the blockchain's ledger 115. For example, a sender of an encrypted message may attach an encrypted message (e.g., encrypted using a recipient's public key) to a zk-token commitment having a value of 0. As such, the sender of the message does not spend tokens to send the message to the recipient. Moreover, since the values in commitments are masked, a third-party inspecting the commitments would not be able to identify which commitments have a value of 0.

Moreover, since the message is encrypted using the recipient's public key, the recipient is able to decrypt the encrypted message using the private key corresponding to the public key used for encrypting the message.

In some embodiments, the sender further signs the message to allow the recipient to verify the identity of the sender. Moreover, the sender may sign the message in a manner that only the recipient is able to confirm the identity of the recipient.

In some embodiments, the secret messages sent through the blockchain 110 is used for communicating the seed $Q=g^x h_2^r$ and the secret number y to allow the first user 120 to transfer a zk-token to the second user 130. In this manner, the second user 130 is able to send the seed Q to the first user 120 to enable the first user to generate one or more zk-tokens, and the first user 120 is able to send the secret number y to the second user 130 to enable the second user to spend the generated zk-token, without relying on a separate private communication channel.

Computing Machine Architecture

The device associated with the sender and the device associated with the recipient, as well as devices associated with entities in the blockchain network, may be a computer (e.g., workstation, laptop, server, or another suitable computer), a smart phone a tablet, or another suitable device or machine (such as an application specific integrated circuit (ASIC) module).

Figure 7:
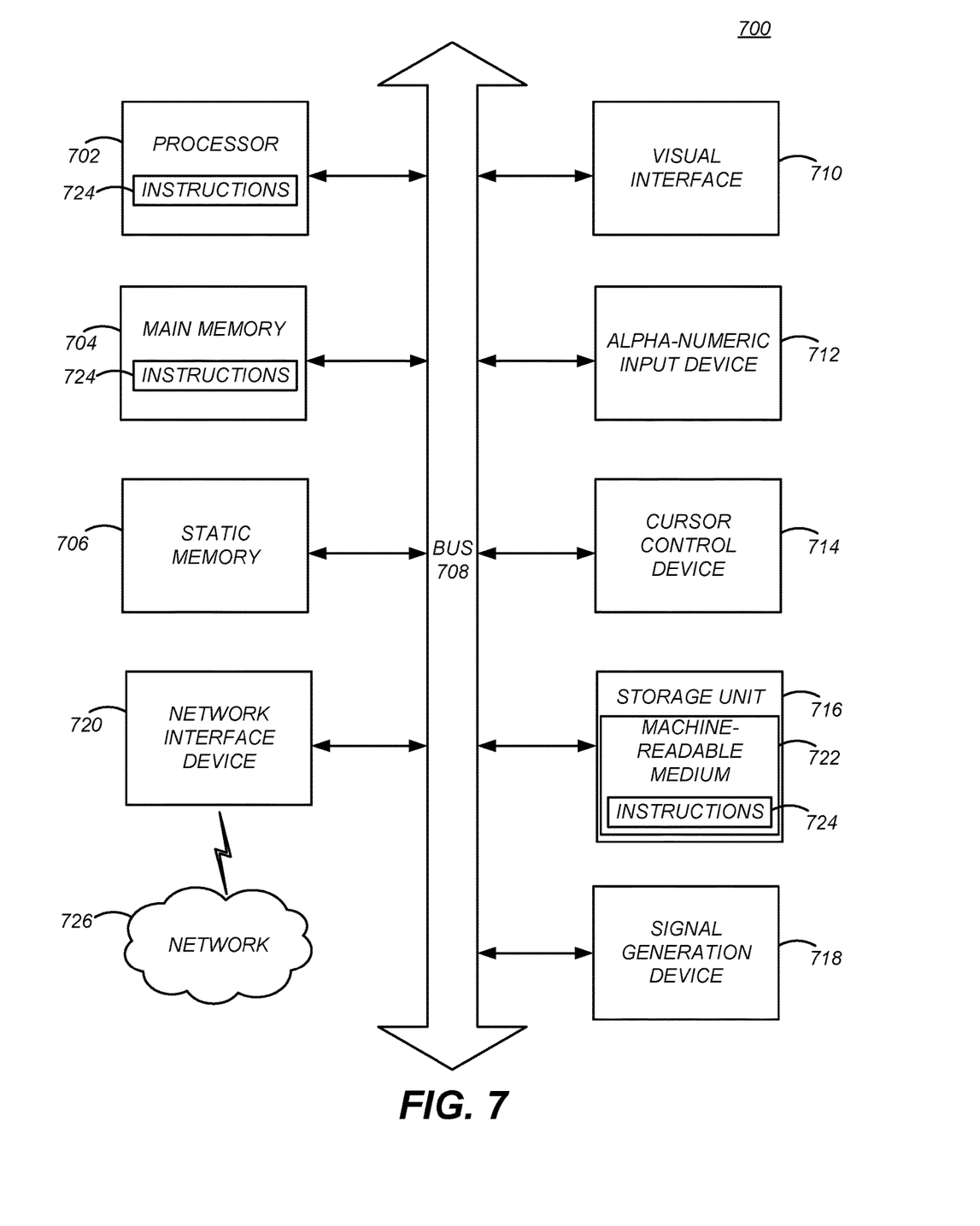
FIG. 7 is a block diagram illustrating components of an example machine able to read instructions from a machine-readable medium and execute them in a processor (or controller), according to one or more embodiments.

FIG. 7 is a block diagram illustrating components of an example machine able to read instructions from a machine-readable medium and execute them in one or more processors (and/or one or more controller). Specifically, FIG. 7 shows a diagrammatic representation of a machine in the example form of a computer system 700 within which instructions 724 (e.g., program code or software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be any computing system that can specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes at least one processor 702 (e.g., a central processing unit (CPU), a graphics processing unit (GPU), a digital signal processor (DSP), one or more application specific integrated circuits (ASICs), one or more radio-frequency integrated circuits (RFICs), a field programmable gate array (FPGA)), a main memory 704, and a static memory 706, which are configured to communicate with each other via a bus 708. The computer system 700 may further include graphics display unit 710 to render (or provide) a user interface for display. The computer system 700 may also include alphanumeric input device 712 (e.g., a keyboard), a cursor control device 714 (e.g., a mouse or other pointing instrument), a storage unit 716, a signal generation device 718 (e.g., a microphone and/or speaker), and a network interface device 820, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configuration is beneficially structured to enable anonymous transactions between entities interacting though a blockchain. As described herein, the parameters of the transaction (such as the value of tokens being transferred between a sender and a recipient) is hidden while allowing the blockchain network to verify the integrity of the transaction. By using zero-knowledge proofs for the various parameters of the transaction, the validity or accuracy of the parameters can be verified by third-party entities in the blockchain network without requiring the sender or the recipient to reveal the parameters themselves.

In addition, the disclosed configuration decouples the set of input tokens of the transaction from the set of output tokens of the transaction. A user attempting to spend a set of input tokens is able to provide a prove to confirm that the user is in possession of the set of input token having a value sufficient to generate the set of output token without revealing the source for the set of input tokens. The zero-knowledge proofs enable a user to prove that a zero-knowledge token exists (i.e., the token has been recorded in the ledger of the blockchain network) without revealing private information about the zero-knowledge token. Moreover, the zero-knowledge proofs enable the user to provide a proof for the value of the zero-knowledge tokens being spent without revealing private information about the zero-knowledge token.

As such, the disclosed configuration enables a sender to send one or more digital tokens to a recipient without revealing the identifying information about the recipient or the value of the tokens being sent. Additionally, the disclosed configuration enables the recipient to spend a set of digital tokens without revealing the source of the digital token being spent. That is, the recipient is able to generate a set of output tokens without revealing the sender that provided, to the recipient, the tokens the recipient is spending. The disclosed configuration enables these transactions while allowing a third-party entity to verify the validity of the transactions and ensuring integrity of the ledger.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for anonymously transmitting an electronic message through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
generating a commitment based on a serial number of a zero-knowledge token, and a value of the zero-knowledge token, wherein generating the commitment comprises:
receiving, from a recipient, a seed value,
generating a random value, and
generating the commitment based on the seed value, the random value, and the value of the zero-knowledge token;
generating a range proof for the commitment, the range proof for verifying that the value of the zero-knowledge token is within a preset range;
generating a balance proof, the balance proof for verifying that a value of a set of input tokens is greater than or equal to the value of the zero-knowledge token; and
transmitting a conversion request, the conversion request for consuming the set of input tokens and for generating the zero-knowledge token, the conversion request including the generated commitment, the generated range proof, and the generated balance proof.

2. The computer-implemented method of claim 1, further comprising:
generating a knowledge proof, the knowledge proof for verifying knowledge of a set of parameters for generating the commitment, and
wherein the conversion request further includes the generated knowledge proof.

3. The computer-implemented method of claim 2, wherein at least one of the range proof, the balance proof, and the knowledge proof are generated using a zero-knowledge proof protocol.

4. The computer-implemented method of claim 1, wherein generating the commitment further comprises:
generating a private key and public key pair; and
generating the serial number for the zero-knowledge token based on the public key.

5. The computer-implemented method of claim 4, further comprising:
transmitting a spending request for spending the zero-knowledge token, the spending request identifying the serial number of the zero-knowledge token and a set of output tokens.

6. The computer-implemented method of claim 5, wherein transmitting the spending request comprises:
generating a zero-knowledge proof that the commitment for the zero-knowledge token is included in a set of commitments, the zero-knowledge proof based on the serial number of the zero-knowledge token used to generate the commitment.

7. The computer-implemented method of claim 6, wherein the zero-knowledge proof that the commitment for the zero-knowledge token is included in a set of commitments is a 1-out-of-N proof.

8. The computer-implemented method of claim 5, wherein transmitting the spending request comprises:
generating a second balance proof, the second balance proof for verifying that a value of a set of input tokens of the spending request is greater than or equal to a value of the set of output tokens of the spending request.

9. The computer-implemented method of claim 5, wherein the spending request is signed using the private key corresponding to the public key used for generating the serial number of the zero-knowledge token.

10. A non-transitory computer readable storage medium configured to store instructions, the instructions when executed by a processor cause the processor to:
generate a commitment based on a serial number of a zero-knowledge token, and a value of the zero-knowledge token, wherein generating the commitment comprises:
receiving, from a recipient, a seed value,
generating a random value, and
generating the commitment based on the seed value, the random value, and the value of the zero-knowledge token;
generate a range proof for the commitment, the range proof for verifying that the value of the zero-knowledge token is within a preset range;
generate a balance proof, the balance proof for verifying that a value of a set of input tokens is greater than or equal to the value of the zero-knowledge token; and
transmit a conversion request, the conversion request for consuming the set of input tokens and for generating the zero-knowledge token, the conversion request including the generated commitment, the generated range proof, and the generated balance proof.

11. The non-transitory computer readable storage medium of claim 10, further comprising instructions that when executed by the processor causes the processor to:
generate a knowledge proof, the knowledge proof for verifying knowledge of a set of parameters for generating the commitment, wherein the conversion request further includes the generated knowledge proof.

12. The non-transitory computer readable storage medium of claim 11, wherein at least one of the range proof, the balance proof, and the knowledge proof are generated using a zero-knowledge proof protocol.

13. The non-transitory computer readable storage medium of claim 10, wherein the instructions for generating the commitment comprises further instructions that when executed by the processor causes the processor to:
generate a private key and public key pair; and
generate the serial number for the zero-knowledge token based on the public key.

14. The non-transitory computer readable storage medium of claim 13, further comprising instructions that when executed by the processor causes the processor to:
transmit a spending request for spending the zero-knowledge token, the spending request identifying the serial number of the zero-knowledge token and a set of output tokens.

15. The non-transitory computer readable storage medium of claim 14, wherein the instructions to transmit the spending request comprises further instructions that when executed by the processor causes the processor to:
generate a zero-knowledge proof that the commitment for the zero-knowledge token is included in a set of commitments, the zero-knowledge proof based on the serial number of the zero-knowledge token used to generate the commitment.

16. The non-transitory computer readable storage medium of claim 15, wherein the zero-knowledge proof that the commitment for the zero-knowledge token is included in a set of commitments is a 1-out-of-N proof.

17. The non-transitory computer readable storage medium of claim 14, wherein the instructions to transmit the spending request comprises further instructions that when executed by the processor causes the processor to:
generate a second balance proof, the second balance proof for verifying that a value of a set of input tokens of the spending request is greater than or equal to a value of the set of output tokens of the spending request.

18. The non-transitory computer readable storage medium of claim 14, further comprising instructions that when executed by the processor causes the processor to confirm the spending request is signed using the private key corresponding to the public key used to generate the serial number of the zero-knowledge token.

19. A system comprising:
one or more processors; and
memory configured to store code comprising instructions, wherein the instructions, when executed by the one or more processors, cause the one or more processors to:
generate a commitment based on a serial number of a zero-knowledge token, and a value of the zero-knowledge token, wherein generating the commitment comprises:
receiving, from a recipient, a seed value,
generating a random value, and
generating the commitment based on the seed value, the random value, and the value of the zero-knowledge token;
generate a range proof for the commitment, the range proof for verifying that the value of the zero-knowledge token is within a preset range;
generate a balance proof, the balance proof for verifying that a value of a set of input tokens is greater than or equal to the value of the zero-knowledge token; and
transmit a conversion request, the conversion request for consuming the set of input tokens and for generating the zero-knowledge token, the conversion request including the generated commitment, the generated range proof, and the generated balance proof.

20. The system of claim 19, wherein the instructions, when executed, further cause the one or more processors to:
generate a knowledge proof, the knowledge proof for verifying knowledge of a set of parameters for generating the commitment, and
wherein the conversion request further includes the generated knowledge proof.

* * * * *